April 20, 1965 D. D. PETTIGREW ETAL 3,178,968
DRILL HEAD MOUNT
Filed March 2, 1962 5 Sheets-Sheet 2

INVENTORS
David D. Pettigrew
Edward J. Niehaus, Jr.

BY Strauch, Nolan & Neale
ATTORNEYS

April 20, 1965 D. D. PETTIGREW ETAL 3,178,968
DRILL HEAD MOUNT
Filed March 2, 1962 5 Sheets-Sheet 3
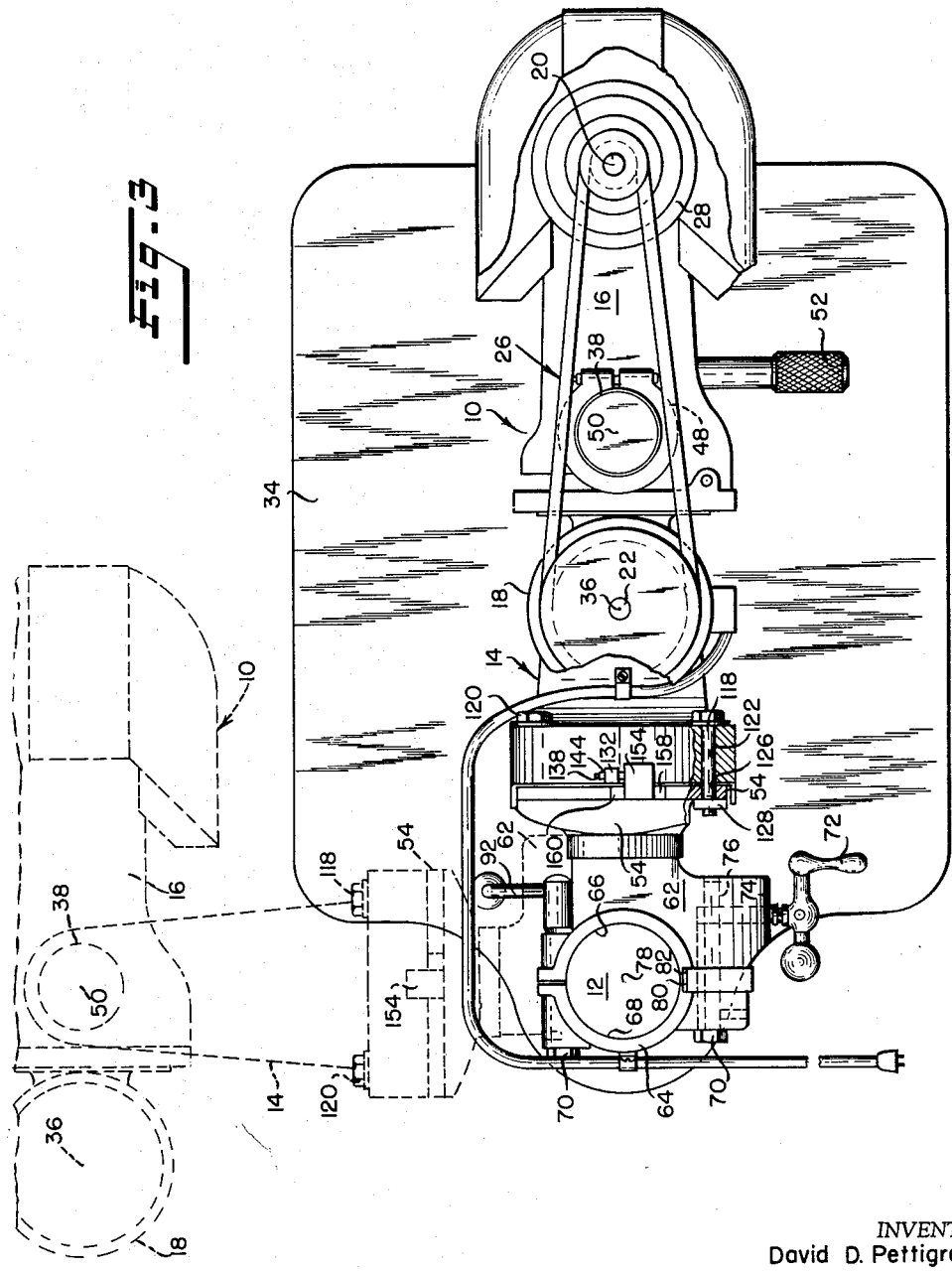
INVENTORS
David D. Pettigrew
Edward J. Niehaus, Jr.
BY
ATTORNEYS

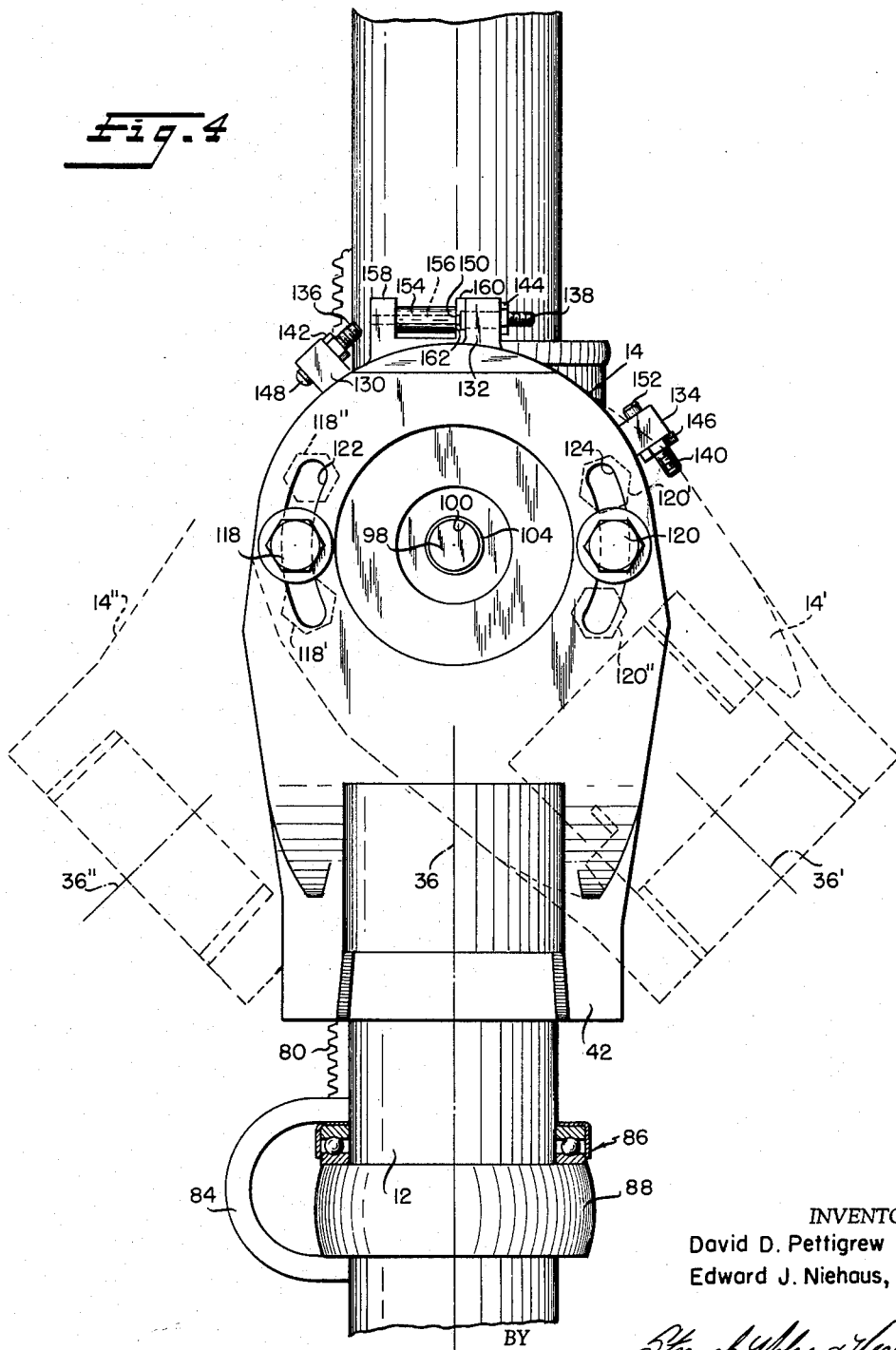

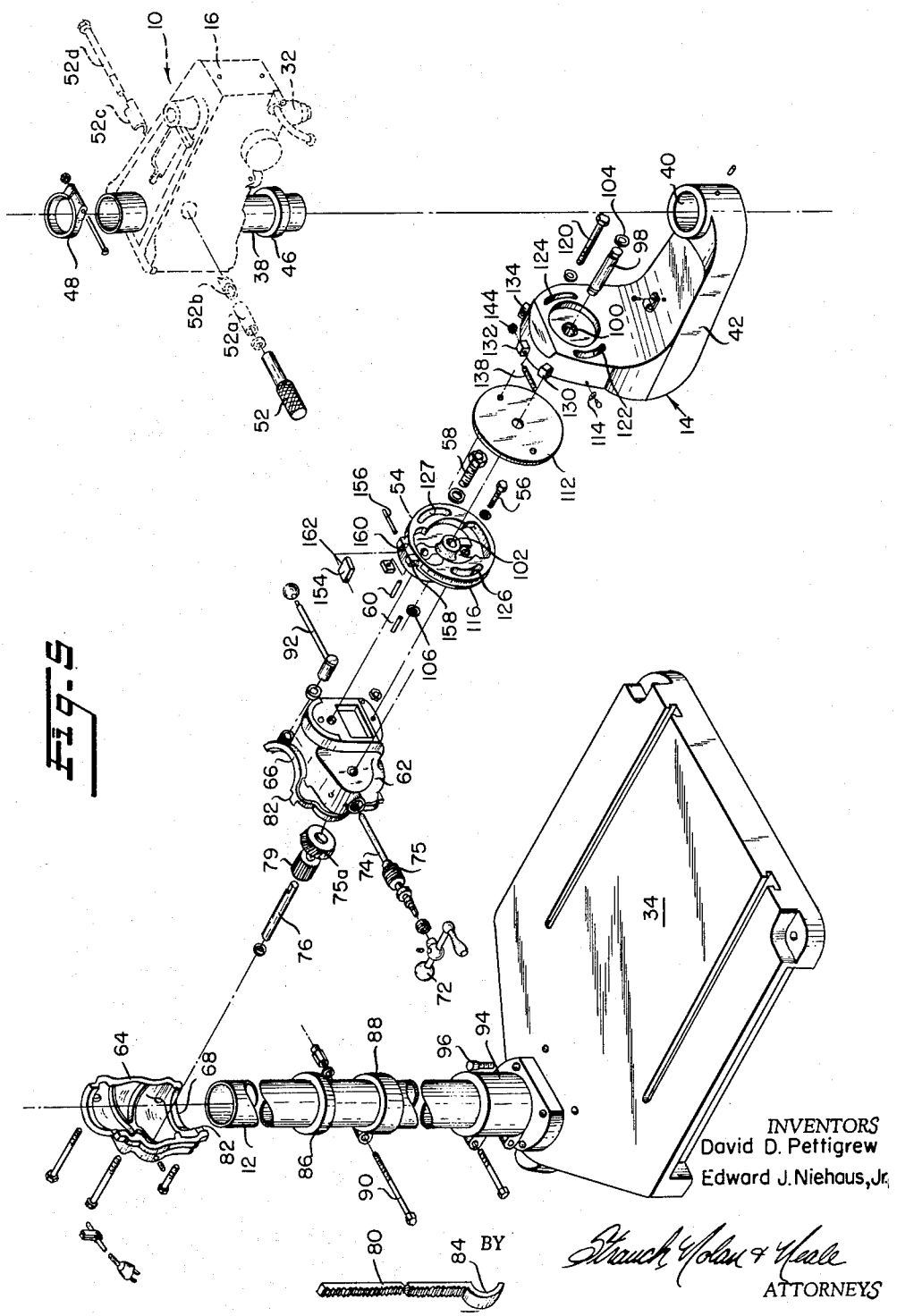

United States Patent Office 3,178,968
Patented Apr. 20, 1965

3,178,968
DRILL HEAD MOUNT
David D. Pettigrew and Edward J. Niehaus, Jr., Pittsburgh, Pa., assignors to Rockwell Manufacturing Company, Pittsburgh, Pa., a corporation of Pennsylvania
Filed Mar. 2, 1962, Ser. No. 177,005
9 Claims. (Cl. 77—31)

The present invention relates to improvements in drill presses and more particularly to improvements in drill head mounts which provide much greater flexibility and ease in positioning the spindle of the drill head relative to the work piece than has been heretofore possible in prior drill head mounting arrangements.

As used herein the term "drill head" refers to the customary drill head structure embodying in ultimate operative assembly a body or casting upon which is mounted an electric drive motor and a drill spindle, the drill spindle being mounted for rotation about an axis parallel to the axis of rotation of the motor rotor and for manual drill feed by longitudinal reciprocation toward and from the work piece along its rotation axis, and the motor output shaft being connected to drive the spindle by a suitable connection, usually a variable speed V-belt drive.

In conventional forms of drill press arrangements, such as is shown in United States Letters Patent 2,567,982, issued September 18, 1951, to C. A. Wiken for Machine Tool, the drill head is mounted for pivotal movement about a vertical column and longitudinal vertical adjustment along that column. In all selectable positions of the drill head in such a drill press, the drill spindle axis is parallel to the longitudinal axis of the column, normally vertical. Special work piece mounting jigs are necessary to support work pieces in position beneath the drill spindle when it is necessary to drill a hole in a work piece in any direction other than perpendicular to the base surface of the work piece. A wide variety of jigs and fixtures is required to accommodate various forms of work pieces and various angles of holes to be drilled. This procedure is extremely expensive and quite unsatisfactory but has long existed since no better solution has been presented.

In order to permit movement of the spindle of the drill head to a position other than on an arc about the axis of the column upon which the drill head is mounted, drill head mounts of the form shown in United States Patent 1,447,317, issued March 6, 1923, to E. C. Mueller for Radial Drill Press and United States Patent 2,629,268, issued February 24, 1953, to M. P. Budney for Universal Locating Drill Press Centering Apparatus were devised. In devices such as these, there is no angular adjustment of the drill head spindle with respect to the axis of the column, i.e. normally, with respect to the vertical.

The only machines in which a drill spindle could be adjusted from the vertical with which applicant is aware is the very old form of drilling machine disclosed in United States Patent 515,988, issued March 6, 1894, to C. H. Baush for Drilling Machine which has no drill head arrangement at all and therefore is not at all suited to present day drilling practices.

In recent years efforts have been made to provide the necessary flexibility in locating the drill spindle axis by utilizing the same principles as are applied in radial arm saws. The structure shown in United States Patent 2,621,-686, issued December 16, 1952, to J. E. Tompkins for Machine Tool With Motor-Driven Rotary and Axially Fed Tools illustrates one example of this approach to the problem.

In providing for pivotal movement of the drill head other than about a purely vertical axis, it is necessary, if ease of adjustment from one position to another is to exist, that the axes about which the drill head is pivotable pass substantially through the center of gravity of the mass formed by the drill head and the elements movable with the drill head. If they do not, the operator must support the drill head at the desired adjusted position of the drill spindle axis in opposition to the turning moment resulting from the weight of the drill head while he is locking the adjusted angular position. As a result, if the axes are not so located, it is impossible to move the drill head simultaneously about both of its pivot axes directly to the desired position but alternate successive positionings and lockings of the drill head about each of its axes to gradually approach the final desired position of the drill spindle are necessary.

While substantially balanced tool mountings can be achieved in radial arm saws such as is disclosed in United States Patent 2,933,111, issued April 19, 1960, to L. E. Fish for Radial Arm Saw, as the aforesaid Tompkins patent demonstrates, attempts to mount drill heads on the mounts for radial arm saws do not result in a balanced support of the drill head, but produce an unnecessarily complicated and expensive mounting structure and do not provide the optimum flexibility of drill head motion.

To overcome the difficulties found in the various prior art structures, the present invention pivotally mounts the drill head so that its pivot axes pass substantially through its center of gravity. The drill head is thus balanced so that it will remain in any adjusted position. By this construction it may be pivoted about its pivot axes simultaneously and when the desired position is reached all adjustments may be locked. This is a very great time saving advantage of the present invention over any prior art construction known to applicant.

Because of the unique flexibility of the drill press of the present invention, an operator can position the cutting tool to the work in five different ways. He can move the entire mechanism up and down on the main column, swivel the mechanism a full 360 degrees around the main column, rotate the head around the mounting post, move the head in and out from the column, and tilt the head 45 degrees left or right, making angle drilling an easy operation and eliminating the need for expensive jigs for holding work pieces at different angles.

The versatile radial drill press of the present invention fills the gap between expensive machine tool type radial drill presses and light duty machines. It offers unusual flexibility. The operator can do regular and angle drilling easily, yet accurately, because expensive jigs for holding work pieces at difficult angles are eliminated. He can move and tilt the drill head instead of the work and do a series of operations without repeatedly clamping the work. Furthermore, walking from one side of the table to the other is minimized. Because of the double swivel linkage, the head can be kept at an angle, placing the feed handle within easy reach of one central operating station, even when drilling holes widely spaced from left to right. Since the drill head tilts 45 degrees left or right, angle drilling is an easy operation because the work is always supported on a flat, level table. Expensive jigs for holding work pieces at different angles are not required.

In view of the foregoing general discussion, it is the primary object of the present invention to provide an improved drill head mount by which the drill spindle may be simultaneously adjusted with respect to two mutually perpendicular axes.

A further object of the present invention is to provide a universal mount for a drill head in which the mass of the drill head is balanced about its pivot axes.

A more specific object of the present invention is to provide a column mounted drill head in which the drill head may be pivotally adjusted about mutually perpendicular axes one of which is normal to the longitudinal axis of the column in all adjusted positions of the drill head.

A still more specific object of the present invention is to provide a column mounted drill head which is mounted for pivotal adjustment about mutually perpendicular axes one of which is normal to the column's longitudinal axis and for adjustment longitudinally of the column whereby the drill spindle can be adjusted so that its axis lies at substantially any selected angle with respect to the column axis.

These and other objects of the present invention will become more fully apparent by reference to the appended claims and as the following detailed description proceeds in reference to the accompanying drawings wherein:

FIGURE 3 is a top plan view, partially in section, of the apparatus of FIGURE 1;

FIGURE 4 is a front elevational view of the drill head mount of the apparatus of FIGURE 1 with the drill head removed; and FIGURE 5 is an exploded perspective view of the drill head mounting structure of the present invention.

Figure 1:
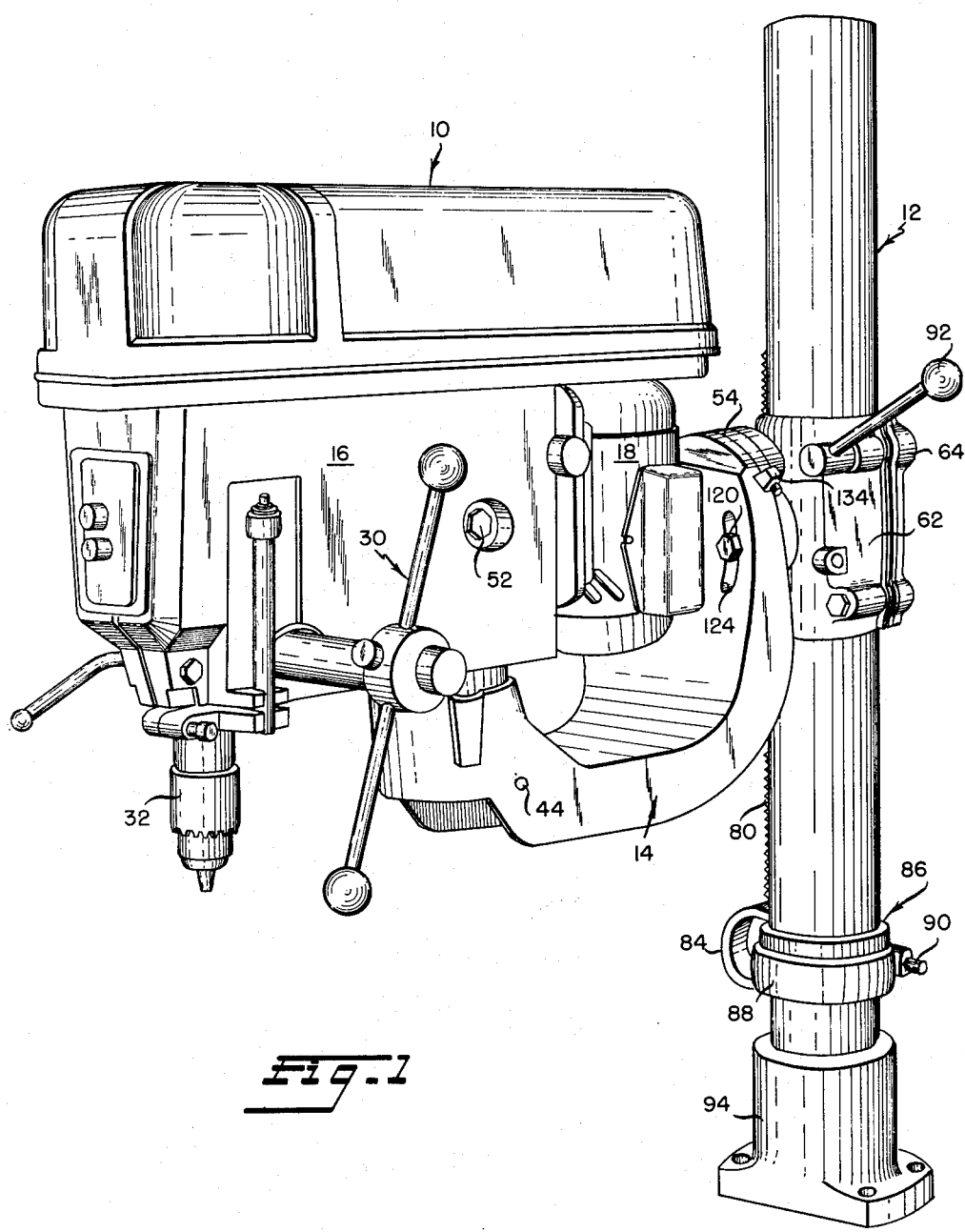
FIGURE 1 is a perspective view of a column mounted drill head embodying the principles of the present invention.

Referring now in detail to the drawings and particularly to FIGURE 1, the drill press of the present invention comprises a self-contained electric motor powered drill head 10, a vertical column 12, and a drill head support bracket 14. Bracket 14 is pivotally mounted on column 12 about an axis normal to the longitudinal axis of the column 12, and to the drill head 10 about an axis normal to the axis about which bracket 14 is pivoted to the column 12. The drill head 10, as is more clearly shown in FIGURE 2, comprises a body casting 16 a drive motor 18, a spindle (not shown) mounted for rotation upon the body casting 16 about the axis 20, and a V-belt drive interconnecting the output shaft 22 of the rotor (not shown) of the motor 18 to the spindle. This drive comprises step cone pulley 24 fixed to shaft 22, V-belt 26 engaging pulley 24, and a step cone pulley 28 driven by belt 26 and connected to drive the spindle while permitting its manual selective longitudinal drill bit feed motion under control of the feed handle 30 (FIGURE 1) to move the chuck 32 toward and from the work piece mounted upon the base 34. The spindle mounting and drive may be of any suitable conventional form such as that shown in the aforesaid Wiken patent. As is apparent, the axis 20 of the spindle is spaced from and parallel to the axis 36 of the rotor of motor 18 and of its output shaft 22.

The drill head 10 is mounted upon the bracket 14 by an axially short column 38 the lower end of which is fixed within a complementary recess 40 in the forwardly extending arm 42 of bracket 14 by set screws 44. Column 38 extends through aligned bearing apertures formed in the top and bottom walls of the housing casting 16, housing casting 16 being axially confined on column 38 between axial thrust ball bearing assembly 46 and collar 48 disposed respectively in abutting relation with the exterior of the bottom and top walls of housing casting 16. The axis 50 of column 38, about which drill head 10 is pivotable with respect to the bracket 14, is parallel to the axes 20 and 36 of the spindle and motor respectively. Axis 50 preferably passes through or sufficiently close to the center of gravity of the drill head 10 so that, when this axis 50 is disposed in any position other than its illustrated vertical position, there is no tendency for the drill head 10 to pivot as a result of its own weight about the axis 50. When the desired adjusted position of the drill head 10 about the axis 50 has been obtained, the drill head 10 is fixed relative to the column 38 by manual rotation of the locking handle 52 which actuates a pair of opposed clamping sleeve wedges 52a, 52b and 52c (FIGURE 5) to bind against the exterior surface of the column 38 to prevent rotation of the casting 16 relative to the column 38. For this purpose, sleeve wedges 52a, 52b and 52c are axially slidably received upon the shank of a screw 52d upon which handle 52 is treated. Collar 52b is wedge-shaped at both ends and engages at its opposite ends complementary wedge surfaces in collars 52a and 52c. Rotation of handle 52 in one direction clamps wedge 52a, 52b and 52c together and forces wedge 52b against column 38 and the wedges 52a and 52c against the walls of the bores in casting 16 in which they are received to thereby immobilize casting 16 relative to column 38. Reverse rotation of handle 52 releases this locking action. As is apparent from FIGURE 3, handle 52 provides good leverage for pivoting drill head 10 about the axis 50, being operative to unlock and lock drill head 10 to column 38 merely by wrist action in the proper direction.

The weight of the drill press head 10 rests upon the upper race of anti-friction type thrust bearing 46 and the lower race of bearing 46 is supported by bracket 14. This mounting of head 10 permits ease of rotation of the head 10 about the axis 50. The collar 48 is a screw actuated clamp by which axial position of the casting 16 along column 38 is fully confined.

The support bracket 14 is pivotally mounted, as will be explained presently, upon an adapter 54 which is fixed by screws 56 and 58 and roll pins 60 to a bracket 62 which is secured to column 12 by a cap 64 as is most clearly shown in FIGURE 3. Bracket 62 and cap 64 are formed with opposed semi-cylindrical recesses 66 and 68 respectively embracing the column 12 and are secured together by screws 70. The cylindrical aperture defined by recesses 66 and 68 is proportioned relative to the outside diameter of column 12 to permit relative rotation therebetween when not clamped thereto as described below. Cap 64 and bracket 62 are positioned as a unit longitudinally of the column 12 by a mechanism comprising a hand crank 72 (FIGURE 5) fixed to a worm shaft 74, a worm 75 coaxially fixed to shaft 74, a worm wheel 75a meshing with the worm and coaxially fixed to a shaft 76, which is journaled on the bracket 62 and cap 64 for rotation about an axis perpendicular to and spaced from the axis 78 of the column 12, a pinion 79 fixed to shaft 76 and in constant mesh with a rack 80 resting against but rotatable about the exterior surface of the column 12. Rack 80 is retained within a complementary recess 82 formed in the walls in and at the juncture of the semi-cylindrical recesses 66 and 68 of the bracket 62 and cap 64. Rack 80 at its lower end is fixed to a U-shaped bracket 84 (best shown in FIGURE 4) which embraces an axial roller bearing assembly 86 and a collar 88. Collar 88 is fixed by clamping screw 90 (FIGURE 5) in a selected vertical position along the column 12 and with bearing 86 establishes the vertical position of rack 80 along column 12 while permitting rack 80 and U-shaped bracket 84 to rotate with the bracket 62 and cap 64 about the column 12.

With the collar 88 fixed relative to column 12, the drill head 10, the bracket 14 and the bracket 62 and cap 64 may be adjusted up and down the column 12 by manipulation of the handle 72 (FIGURE 3). When the desired vertical position of the drill head 10 has been obtained, this vertical posiiton is fixed by actuation of the locking handle 92 (FIGURE 3) which fixes bracket 62 and cap 64 to column 12 against both longitudinal movement along column 12 and pivotal movement about column 12.

Due to the non-overrunning nature of the drive connection between handle 72 and rack 80, the bracket 62 and cap 64 will remain in their adjusted vertical positions while they are pivoted about the column 12 with the screw actuated clamp lock controlled by handle 92 in its unlocked position.

Figure 2:
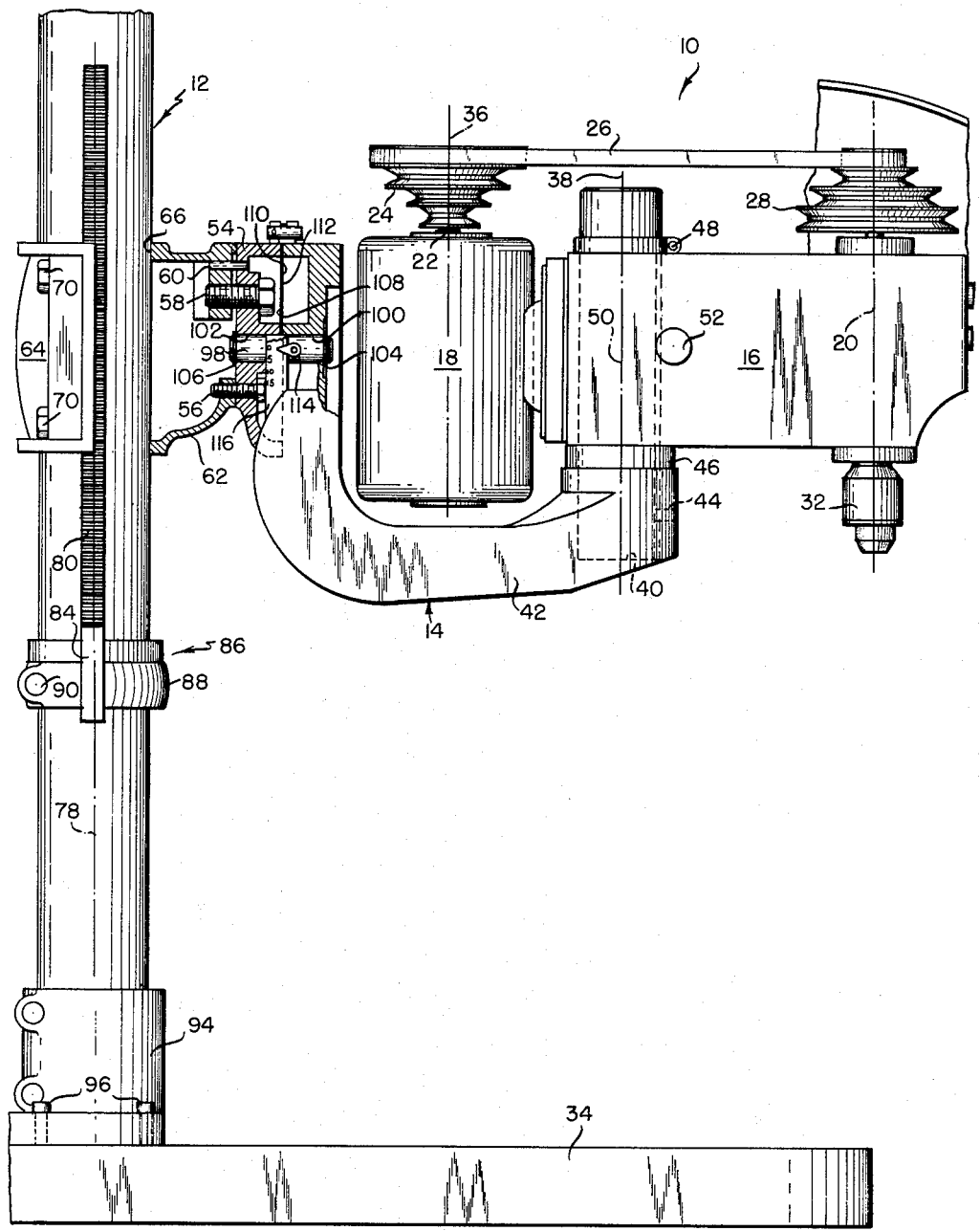
FIGURE 2 is a side elevational view partially in section of the drill press of FIGURE 1.

As is most clearly shown in FIGURE 2, the column 12 is mounted with its axis 78 in vertical position by a bracket 94 fixed to the base casting 34 by screws 96 in accordance with conventional practice.

Referring now to FIGURE 2, the bracket 14 is pivotally mounted upon the adapter 54 by a pivot pin 98 which is axially fixed with respect to these members in their aligned bores 100 and 102 by retainer rings 104 and 106 at its opposite ends. Bracket 14 and adapter 54 are formed with opposed planar faces 108 and 110 respectively normal to the axis of the pivot pin 98 and separated by a spacer bearing plate 112.

The bracket 14, as illustrated, is in its "0" position in which the spindle axis 20 is parallel to the axis 78 of the column 12, i.e., vertical. Bracket 14 may be pivoted 45° in either direction from this zero position so that the parallel axes 20, 36 and 50 may all be inclined at angles of 45° or less to the axis 78 of the column 12 and top surface of the work support table 34 in either direction as is apparent from FIGURE 4.

A pointer 114 fixed to the bracket 14 and cooperating with a scale 116 graduated in degrees and fixed to adapter 54 provides a direct reading indication of the angle of tilt of the axis 20 of the spindle.

When the desired position of the axis 20 of the spindle has been achieved by pivotal motion of the bracket 14 about the axis of the pin 98, the bracket 14 may be rigidly clamped to the adapter 54 by tightening bolts 118 and 120. As is best shown in FIGURES 3, 4 and 5, bolts 118 and 120 extend through arcuate slots 122 and 124 in the bracket 14 and through arcuate slots 126 and 127 in the adapter 54 and are threadedly engaged with nuts 128 at their ends adjacent column 12. Slots 122, 124, 126 and 127 have arcuate extents of approximately 50° each so that the maximum relative movement between bracket 14 and adapter 54 is about 100°. The holes in plate 112 are arcuately spaced 180° to maintain 180° spacing between bolts 120 at all times. The use of shorter arcuate slots in each of two members rather than longer arcuate slots in but one of the members results in a stronger, more rigid unit, a factor of extreme importance for drilling accuracy.

In order to facilitate positioning of the spindle axis 20 at its "0" or vertical position and at its opposite 45° limit positions, pre-set stops are provided. For this purpose, three radially projecting lugs 130, 132, and 134 (FIGURE 4) are formed on the periphery of the bracket 14 coaxial with its bore 100. Each of the lugs 130, 132, and 134, is formed with an internally threaded through aperture tangential to a common arc about the axis of bore 100. These bores threadedly receive stop screws 136, 138, and 140 respectively which are fixed in position relative to lugs 130, 132, and 134 by lock nuts 142, 144, and 146 respectively. The stop screws 136, 138 and 140 are adjusted so that their projecting ends 148, 150 and 152 lie at exactly 45° intervals about the axis of the pin 98.

A cooperating stop block 154 is pivotally mounted upon a pin 156 supported on the adapter 54 by lugs 158 and 160 formed integral with the periphery thereof. The end surface 162 of stop block 154 cooperates with the stop screw ends 148, 150 and 152 to establish the 45°, 0° and 45° positions of the drill head 10 and the spindle axis 20 with respect to the axis of the pin 98 in the manner illustrated in FIGURE 4 for the "0" position. When it is desired to shift from the "0" position, for example, to place the bracket 14 in its 45° position illustrated at 14' in dotted lines in FIGURE 4, the stop block 154 is lifted about its pivot shaft 156 to permit the lug 132 to pass, the bracket 14 is rotated sufficiently to bring its lug 132 past the stop block 154, the stop block 154 restored to its position as illustrated and the bracket 14 brought to the position in which the end 152 of the stop screw 140 abuts the surface 162 of the stop block 154. This is the position of bracket 14 indicated at 14' in FIGURE 4.

When it is desired to shift the bracket 14 to the position illustrated at 14" in FIGURE 4, the stop block 154 is again lifted about its pivot shaft 156 and the bracket 14 rotated in a clockwise direction about the pivot pin 98 until all of the lugs 130, 132, and 134 are located to the right of the surface 162 of the stop block 154 and the bracket 14 then rotated slightly in a counterclockwise direction about the axis of the pin 98 to bring the end 148 of the stop screw 136 into abutment with the surface 162 of the stop block 154.

The lock bolts 118 and 120 are, of course, unlocked before attempting to move the bracket 14 and relocked after the desired adjusted position is achieved to prevent inadvertent movement of the drill head 10 about the axis of pin 98.

The axis of the pin 98 passes substantially through the center of gravity of the drill head 10 and preferably is normal to the axis 50 of the column 38 so that there is no tendency for the drill head 10 to pivot under the influence of its own weight about the axis of the pin 98.

While the bearing structure between the bracket 14 and the adapter 54 is made as free-turning as practical commensurate with the needs of the operator and the expense of the unit, there is a certain residual frictional resistance to turning of the drill head 10 about the axis of the pin 98 so that it is not essential that the axis of the pin 98 pass exactly through the center of gravity of the drill head 10 bracket 14 to avoid weight-induced turning of this structure about the axis of pin 98, its passage substantially through the center of gravity of that structure sufficing to prevent this rotation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a drill press,
    (a) a self contained electric motor powered drill head having a tool driving spindle rotatable about a first axis,
    (b) a drill head support column, and
    (c) means mounting said drill head for pivotal movements about said column and about mutually perpendicular second and third axes,
    (d) said second axis being maintained normal to the longitudinal axis of said column in all adjusted positions of said drill head,
    (e) said first axis being maintained parallel to said third axis in all adjusted position of said drill head about said second axis,
        said mutually perpendicular second and third axes intersect sufficiently close to the center of gravity of said drill head that said drill head tends to remain in any adjusted position about either of said second or third axes so that all of said adjustments may be made simultaneously.

2. The combination defined in claim 1 wherein said drill head comprises,
    (a) a rigid body,
    (b) a motor mounted on said body,
        (b1) said motor having an output shaft rotatable about an axis in fixed relation to said body and in fixed parallel relation to said first axis,
    (c) said spindle being mounted on said body for longitudinal reciprocation along said first axis, and
    (d) means connecting said motor output shaft and said spindle whereby rotation of said output shaft will impart rotation to said spindle.

3. The combination defined in claim 1 wherein said mounting means comprises a rigid bracket.

4. The combination defined in claim 3 including a bracket mounting means having locking means for preventing pivotal movement of said bracket from any adjusted position about said second axis.

5. The combination defined in claim 3 including a locking means for preventing pivotal movement of said drill head relative to said bracket about said second axis.

6. The combination defined in claim 3 including means mounting said bracket for selective positional movement longitudinally of said column.

7. The combination defined in claim 3 including means mounting said bracket for selective positioning pivotal movement about the longitudinal axis of said column.

8. In a drill press,
   (a) a self-contained electric motor powered drill head having a tool driving spindle rotatable about a first axis,
   (b) a normally vertical drill head support column, and
   (c) means mounting said drill head upon said column for pivotal movement about mutually perpendicular axes intersecting substantially at the center of gravity of said drill head and one of which is always parallel to said first axis and the other of which is always perpendicular to said column whereby said drill head spindle may be adjusted toward and from said column and toward and from parallelism with the axis of said column simultaneously since said drill head tends to remain in any adjusted position about either of said mutually perpendicular axes.

9. In a drill press,
   (a) a self contained electric motor powered drill head having a tool driving spindle rotatable about a first axis,
   (b) a drill head support column, and
   (c) means mounting said drill head for pivotal movements about said column and about mutually perpendicular second and third axes and for preventing longitudinal movements of said drill head along said column and said second and third axes during such pivotal movements,
   (d) said second axis being in the same plane as and maintained normal to the longitudinal axis of said column in all adjusted positions of said drill head,
   (e) said first axis being maintained parallel to said third axis in all adjusted positions of said drill head about said second axis,
whereby said drill head spindle may be adjusted toward and from, about, and toward and from parallelism with the axis of said column to thereby provide for substantially universal positioning of the spindle axis with respect to a workpiece at least one of said mutually perpendicular second and third axes passing through said drill head sufficiently close to the center of gravity thereof that said drill head tends to remain in any adjusted position about said one of said second and third axes.

References Cited by the Examiner
UNITED STATES PATENTS
2,413,084   12/46   Sommer et al.

FOREIGN PATENTS
1,499   1/99   Great Britain.
569,292   11/57   Italy.

WILLIAM W. DYER, Jr., *Primary Examiner*.
FRANK H. BRONAUGH, JOHN C. CHRISTIE,
*Examiners.*